United States Patent
Plotnikov et al.

(10) Patent No.: US 7,640,580 B1
(45) Date of Patent: Dec. 29, 2009

(54) METHOD AND APPARATUS FOR ACCESSING A COMPUTER BEHIND A FIREWALL

(75) Inventors: Igor Plotnikov, Sunnyvale, CA (US); Alexander Sokolsky, San Jose, CA (US); Michael L. Herne, Livermore, CA (US)

(73) Assignee: F5 Networks, Inc., Seattle, WA (US)

( * ) Notice: Subject to any disclaimer, the term of this patent is extended or adjusted under 35 U.S.C. 154(b) by 0 days.

(21) Appl. No.: 09/574,738

(22) Filed: May 17, 2000

(51) Int. Cl.
*H04L 29/06* (2006.01)

(52) U.S. Cl. ....................................... 726/12

(58) Field of Classification Search ............... 73/159, 73/153, 155, 160, 201; 709/217, 218, 219, 709/220, 221, 222, 225, 226, 227, 229; 726/12
See application file for complete search history.

(56) References Cited

U.S. PATENT DOCUMENTS

| | | | |
|---|---|---|---|
| 5,850,451 A | 12/1998 | Sudia | 380/49 |
| 6,463,474 B1 * | 10/2002 | Fuh et al. | 709/225 |
| 6,510,464 B1 * | 1/2003 | Grantges et al. | 709/225 |
| 6,598,167 B2 * | 7/2003 | Devine et al. | 713/201 |

* cited by examiner

*Primary Examiner*—Gilberto Barron, Jr.
*Assistant Examiner*—Cordelia Kane
(74) *Attorney, Agent, or Firm*—Darby & Darby P.C.; Scott M. Tobias

(57) ABSTRACT

A method and apparatus for accessing a destination computer behind a firewall using a browser are described. In one embodiment, the method includes an intermediary service receiving a destination computer request, which demonstrates that the destination computer is available to be accessed, and receiving a browser request to access the destination computer. The method then includes the intermediary service associating the browser with the destination computer and providing communication between the browser and the destination computer. The communication is being provided in a form acceptable to the firewall.

35 Claims, 11 Drawing Sheets

METHOD AND APPARATUS FOR ACCESSING A COMPUTER BEHIND A FIREWALL

FIELD OF THE INVENTION

The present invention relates to the field of remote access of computers; more particularly, the present invention relates to accessing a computer behind a firewall using a remotely located browser.

BACKGROUND OF THE INVENTION

Today, people may access networks and other computer systems from remote locations. Currently available remote access techniques allow users to access their home computer while they are at work or some other remote location. A problem may exist, however, when an individual tries to access a computer within an internal company network such as a local area network (LAN) or an Intranet. For instance, travelling professionals may need to access a file or an application located on their work computer to prepare for a meeting held miles away from their office, or an employee working from home may be in need of certain information stored on his or her computer at work.

Some existing software products provide remote access capability to users wishing to access an internal network computer if all computers within the internal network have public Internet addresses allocated by an Internet Service Provider (ISP). Problems arise when an organization deploys a firewall at the boundary of the internal network to protect it from external access.

A firewall is a device that links an organization's internal network to the Internet and restricts the types of traffic that can pass through, thereby providing security. The firewall may force all network connections to pass through a gateway, where they can be examined and evaluated. The firewall may be configured to use the network address translation (NAT) technique which provides for replacing the source Internet addresses of transactions coming from computers behind the firewall with the Internet address of the firewall itself. As a result, resources on the Internet only see the address of the firewall and cannot learn anything about the addressing structure on the secure side of the firewall. Because all computers behind the same firewall are represented by the same Internet address (i.e. the Internet address of the firewall), a particular computer cannot be identified by a resource outside of the firewall and, therefore, cannot be activated and/or accessed by a remote user. The firewall may also include an application proxy, such as an http proxy that further isolates the enterprise network from the Internet.

Therefore, what is needed is a technique for activating and/or accessing a computer behind a firewall from a remote location in a secure manner.

SUMMARY OF THE INVENTION

A method and apparatus for accessing a destination computer behind a firewall using a browser are described. In one embodiment, the method includes an intermediary service receiving a destination computer request, which demonstrates that the destination computer is available to be accessed, and receiving a browser request to access the destination computer. The method then includes the intermediary service associating the browser with the destination computer and providing communication between the browser and the destination computer. The communication is being provided in a form acceptable to the firewall.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

Figure 1:
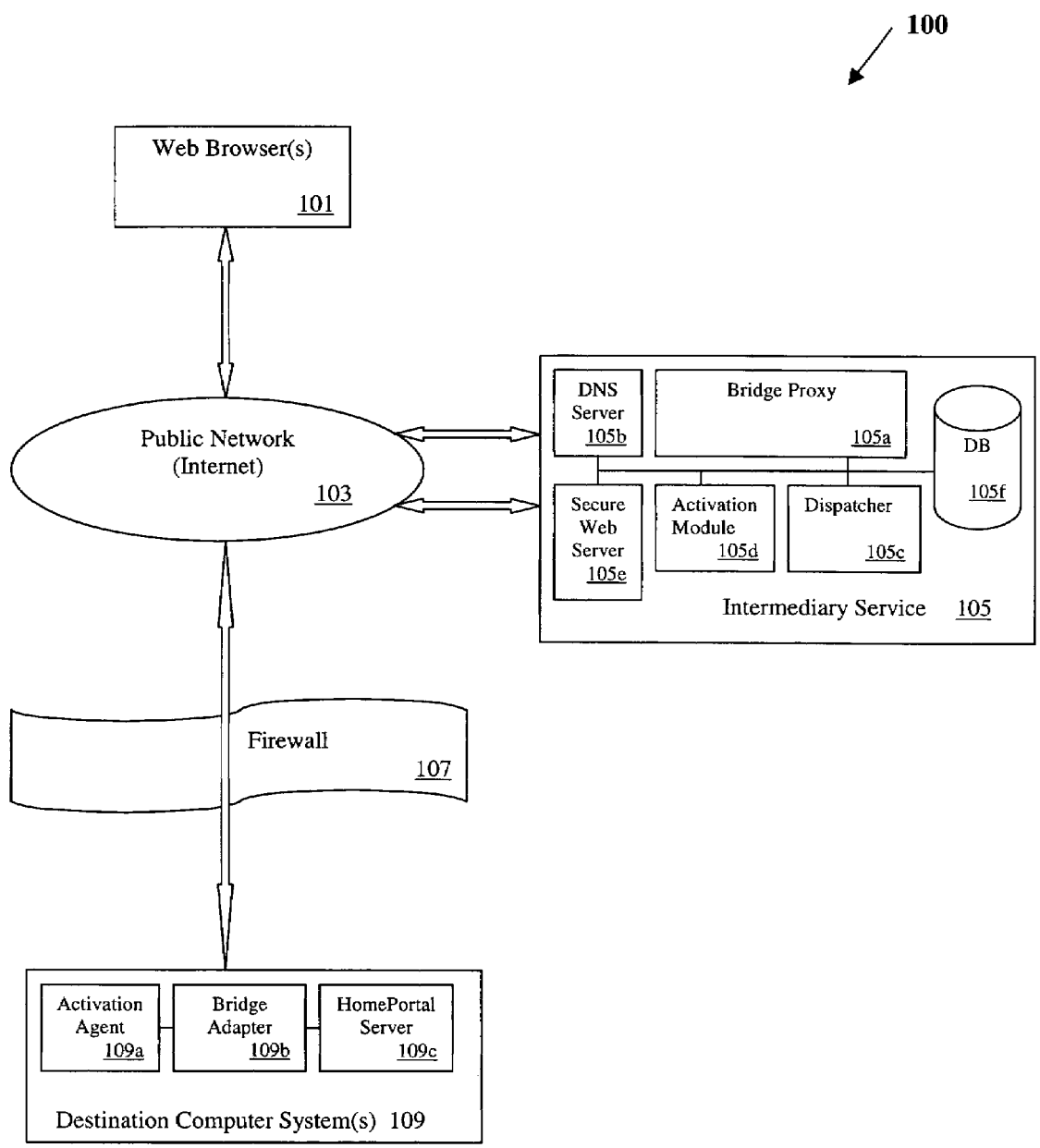
FIG. 1 is a block diagram of one embodiment of a system in which an arbitrary web browser accesses a destination computer system behind a firewall.

A method and apparatus for using an intermediary service to gain remote access to a destination computer behind a firewall are described. In the following description, numerous details are set forth, such as distances between components, types of molding, etc. It will be apparent, however, to one skilled in the art, that the present invention may be practiced without these specific details. In other instances, well-known structures and devices are shown in block diagram form, rather than in detail, in order to avoid obscuring the present invention.

In the following description, for purposes of explanation, numerous specific details are set forth in order to provide a thorough understanding of the present invention. It will be apparent, however, to one skilled in the art that the present invention can be practiced without these specific details. In other instances, well-known structures and devices are shown in block diagram form in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "calculating" or "determining" or "displaying" or the like, may refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus. Instructions are executable using one or more processing devices (e.g., processors, central processing units, etc.).

The algorithms and displays presented herein are not inherently related to any particular computer or other apparatus. Various general purpose machines may be used with programs in accordance with the teachings herein, or it may prove convenient to construct more specialized apparatus to perform the required method steps. The required structure for a variety of these machines will appear from the description below. In addition, the present invention is not described with reference to any particular programming language. It will be appreciated that a variety of programming languages may be used to implement the teachings of the invention as described herein.

One embodiment of a system for accessing a destination computer behind a firewall will now be described in detail. FIG. 1 is a block diagram of one embodiment of a system in which an arbitrary web browser accesses a destination computer behind a firewall. Referring to FIG. 1, an end-user remote web browser 101, an intermediary service 105, a destination computer system 109, a firewall 107, and a public network (e.g., Internet) 103 are shown.

The web browser 101 connects to the public network 103. In one embodiment, the browser 101 connects to the public Internet network via the TCP/IP protocol using http or https. The browser 101 is arbitrary, as it does not need any additional hardware or software support to allow it to gain access to the destination computer system 109. The browser 101 communicates with the intermediary service 105 via the public network 103. In one embodiment, multiple browsers 101 concurrently communicate with the intermediary service 105.

In one embodiment, the destination computer system 109 is connected to other destination computer systems via an internal network (not shown), e.g. a local area network (LAN) or Intranet. Destination computer systems 109 communicate with the public network 103 and the intermediary service 105 through a firewall 107. The firewall 107 is logically placed at the central connection of the internal network to the public network 103. The firewall 107 may be one or more routers, a personal computer, a host, or a collection of hosts, set up specifically to protect the destination computer systems 109 from external access.

The destination computer systems 109 may be configured to force all data incoming to and outgoing from the destination computer systems 109 to pass through the firewall 107. The firewall 107 may also be configured to hide Internet (IP) addresses of destination computer systems 109 by replacing the IP addresses of the destination computers 109 with its own IP address using the NAT technique. Consequently, when the browser 101 requests access to the destination computer 109, the true address of the destination computer 109 cannot be obtained to activate and access the destination computer 109 upon a request of browser 101.

In order to overcome the above firewall protection, the destination computer 109, instead of waiting for the browser request, actively participates in the process by "advertising" itself. Specifically, the destination computer 109 makes regular connections to the intermediary service 105 by sending it, at negotiated intervals, messages demonstrating that the destination computer system 109 is available to be accessed. In one embodiment, the messages are issued in the form of http requests to imitate the typical activity of a web browser on the destination computer 109. Accordingly, the firewall 107 considers these messages as a part of regular browsing activity initiated on the destination computer 109 and allows them to pass through to the intermediary service 105. In one embodiment, the response to the advertisement request may define the time of the next advertisement.

When the user intends to access the destination computer system 109, the browser 101 is used to issue an activation request to the intermediary service 105. The intermediary service 105 receives the activation request from the browser 101, matches it with a corresponding advertisement of the destination computer system 109, and passes the activation request to the destination computer system 109. To circumvent the firewall protection, the intermediary service 105 includes the activation request as part of the response to the destination computer system. In one embodiment, the response is in the form of an http response. The http response sent by the intermediary service 105 corresponds to the http request previously issued by the destination computer 109 as one of its "advertisements".

Upon receiving the activation request in the above format, the destination computer system 109 processes it and sends a reply to the intermediary service 105, which then passes it to the browser 101. Again, in order to overcome the firewall limitations, the destination computer system 109 includes its reply in an http request, thereby imitating the typical data flow from the web browser on the destination computer 109. Accordingly, the intermediary service 105 enables communications between the browser 101 and the destination computer system 109.

In one embodiment, the intermediary service 105 comprises an activation module 105d, a dispatcher 105c, and a proxy 105a. The activation module 105d coordinates the registration of users who request access to a destination computer behind the firewall 107 using a remote browser, e.g., the browser 101, and notifies the dispatcher 105c about each browser request. The dispatcher 105c receives regular advertisements from various destination computer systems, uses these advertisements to match the browser with a corresponding destination computer system, and redirects the destination computer system 109 to the bridge proxy 105a. The bridge proxy 105a provides subsequent communications between the browser 101 and the destination computer system 109 as described in greater detail below.

The intermediary service 105 further includes a database 105f, a secure web server 105e, and a DNS server 105b. The database 105f stores various information used by the activation module 105d, the dispatcher 105 and the bridge proxy 105a. The secure web server 105e ensures that the user authentication is performed in a secure manner. The DNS server 105b cooperates with the bridge proxy 105a to identify an intermediary IP address assigned for communication between the bridge proxy 105a and the browser 101.

In one embodiment, all components of the intermediary service 105 run on one computer system. Alternatively, the components of the intermediary service 105 may run on two or more computer systems. It should be noted that the intermediary service 105 may have other components in addition to those described above and that the components described above may be combined in any manner without loss of generality.

Figure 2:
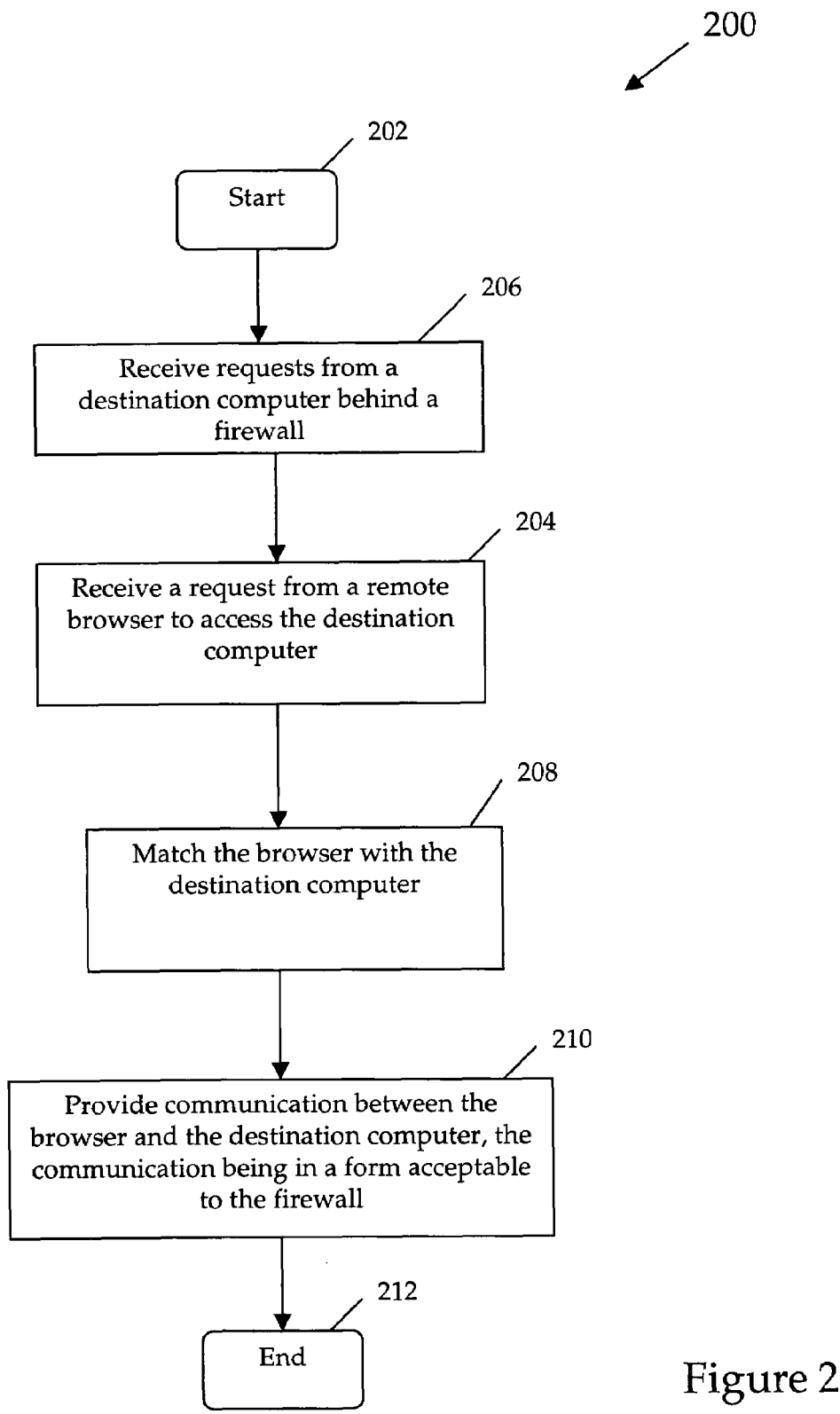
FIG. 2 is a flow diagram of one embodiment of a process running on an intermediary service for providing remote access to a destination computer system behind a firewall.

FIG. 2 is one embodiment of a process running on the intermediary service 105 for remotely accessing a destination computer system behind a firewall. The process is performed by processing logic, which may comprise hardware, software, or a combination of both. The processing logic may be either in the computer system(s) of the intermediary service 105, or partially or entirely in a separate device and/or system(s).

Referring to FIG. 2, the process begins with the intermediary service 105 receiving requests from various destination computer systems behind the firewall 107 (processing block 204). As described above, the requests are "advertisements" of the destination computers demonstrating that they are available to be accessed. In one embodiment, each destination computer system 109 issues advertisements at negotiated intervals. At processing block 206, processing logic in the intermediary service 105 receives a request from the browser 101 to access a particular destination computer behind the firewall 107. It should be noted that although processing block 204 is illustrated as followed by processing block 206, both processing blocks may be performed in parallel. As described in greater detail below, in one embodiment, processing logic in the intermediary service 105 receives an advertisement from the destination computer 109, receives the request from the browser 101, and then, after some waiting period, receives the next advertisement of the destination computer 109 which is used to match the destination computer 109 and the browser 101.

At processing block 208, processing logic in the intermediary service 105 matches the browser with an appropriate destination computer using the browser request and a corresponding destination computer request. The matching then leads to activation of the destination computer. One embodiment of the process of activating the destination computer is described in more detail below in conjunction with FIGS. 5a and 5b.

Afterwards, processing logic in the intermediary service 105 provides communication between the browser 101 and the destination computer 109. The communication is in a form acceptable to the firewall 107. One embodiment of the process of providing communication between the browser 101 and the destination computer 109 is described in more detail below in conjunction with FIGS. 6a and 6b.

Returning to FIG. 1, the destination computer system 109 may comprise various applications. In one embodiment, the destination computer system 109 comprises an activation agent 109a, a bridge adapter 109b, and a home portal server 109c. The activation agent 109a coordinates the functions of issuing advertisements and performing authentication of the user when the browser 101 sends a request to access the destination computer system 109. The bridge adapter 109b receives browser requests from the intermediary service 105, transfers them to the home portal server 109c for processing, receives responses from the home portal server 109c, and sends them to the intermediary service 105 in the form of requests (e.g., http requests). The home portal server 109c processes the browser requests, generates responses and passes them to the bridge adapter 109b. Although only three components are shown, the destination computer system 109 may have more than or less than three components.

Figure 3:
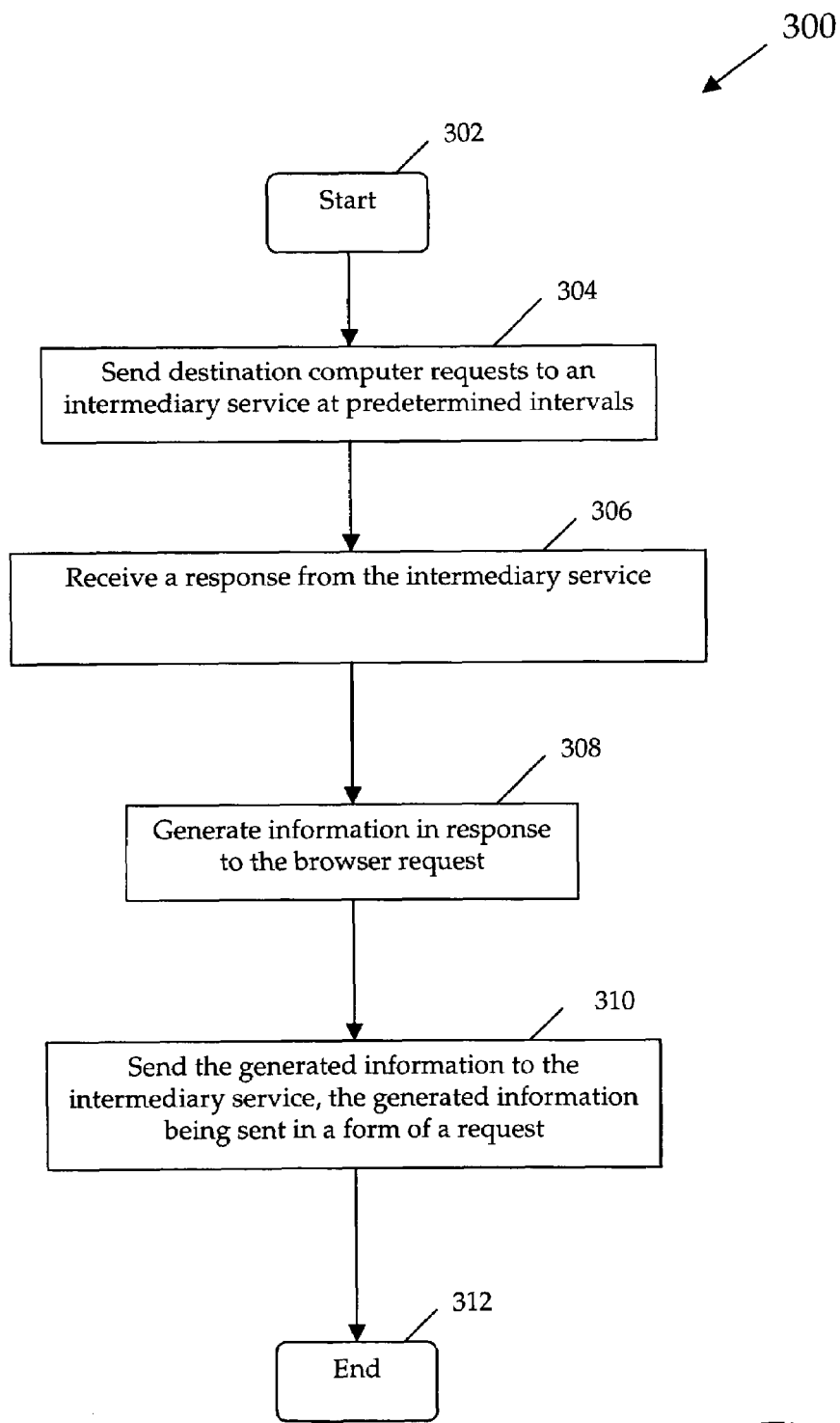
FIG. 3 is a flow diagram of one embodiment of a process running on a destination computer for providing access to the destination computer through a firewall.

FIG. 3 is a flow diagram of one embodiment of a process running on the destination computer 109 for providing access to the destination computer 109 through the firewall 107. The process is performed by processing logic, which may comprise hardware, software, or combination of both. The processing logic may be either in the destination computer system 109, or partially or entirely in a separate device and/or system.

Referring to FIG. 3, the process begins with the destination computer 109 sending requests to the intermediary service 105 at predetermined intervals (processing block 304). As described above, the destination computer requests are advertisements demonstrating that the destination computer 109 is available to be accessed. One embodiment of the process of advertising availability of the destination computer 109 is described in more detail in conjunction with FIG. 4.

At processing block 306, processing logic in the destination computer 109 receives a request of the remote browser 101 to access the destination computer 109. As discussed above, in order to circumvent the firewall protection of the destination computer 109, the intermediary service 105 sends the browser request in the form of a response (e.g., an http response).

Next, processing logic in the destination computer 109 generates information in response to the browser request (processing block 308). Afterwards, at processing block 310, processing logic in the destination computer 109 sends the generated information to the intermediary server 109. To comply with the security policy of the firewall 107, the destination computer 109 includes the generated information in a request (e.g., an http request). The intermediary server 105 subsequently delivers the destination computer response to the browser 101. Processing the browser request by the destination computer 109 is described in greater detail below in conjunction with FIG. 7a.

Figure 4:
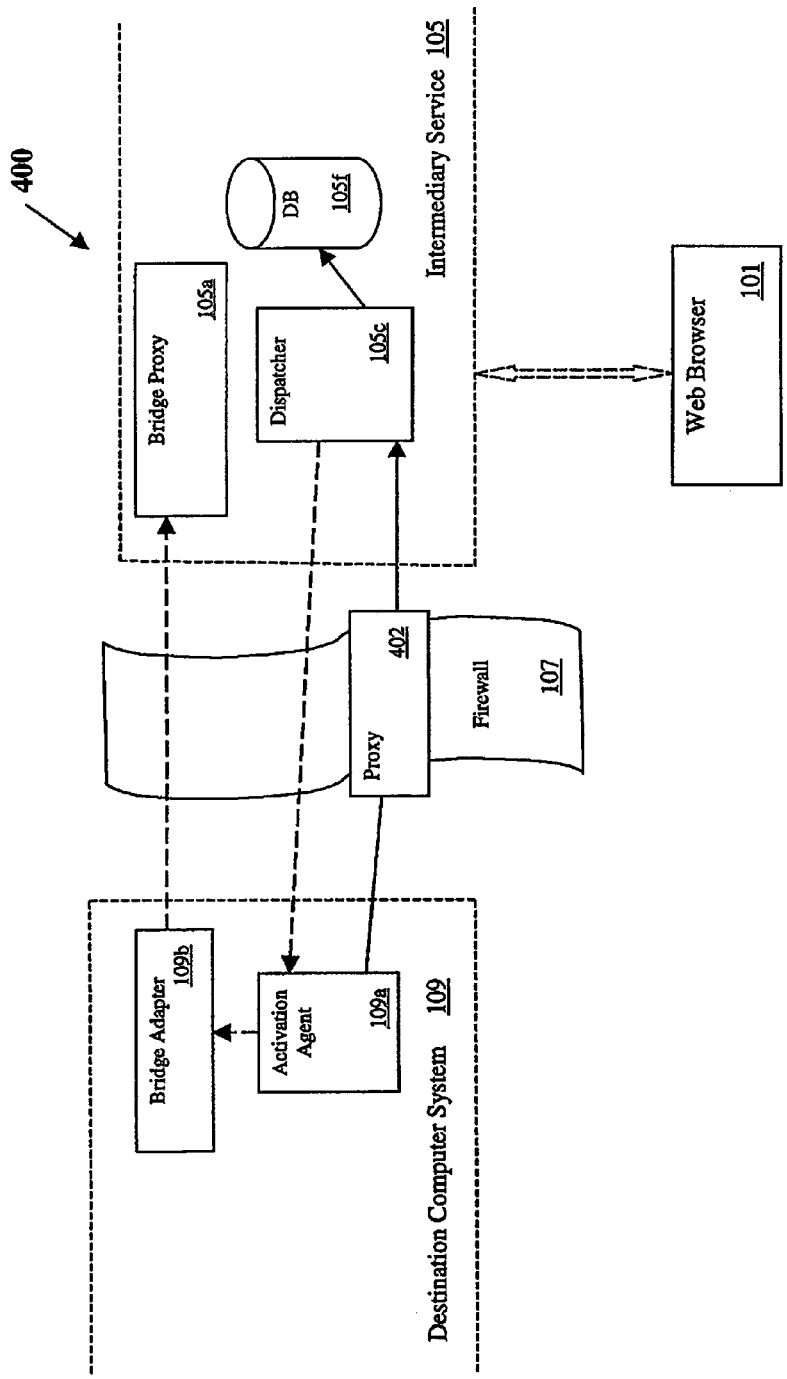
FIG. 4 is a block diagram of one embodiment of a process flow for advertising availability of a destination computer.

One embodiment of the data flow of the advertisement activity of the destination computer 109 will now be described in more detail with reference to FIG. 4. Referring to FIG. 4, the destination computer system 109, through the activation agent 109a, makes regular connections with the intermediary service 105, by issuing requests (e.g., http requests) at predetermined intervals. The requests demonstrate the availability of the destination computer 109 for remote access. In one embodiment, the activation agent 109a establishes TCP/IP connections with the dispatcher 105c of the intermediary service 105. In another embodiment, the activation agent 109a establishes http connections with the dispatcher 105c.

The advertisements of the activation agent 109a circumvent the firewall protection of the destination computer 109 even if the firewall 107 is a proxy firewall. A proxy firewall (shown by firewall 107 and a proxy 402) not only controls the traffic incoming to the computers within the internal network as does a regular firewall, but also the traffic going outside of the firewall. In addition, the proxy firewall accepts a response from or to an internal network computer only if there was an outstanding request. Another limitation of the proxy firewall 107 is that it represents all computers behind it by its own IP address so that a particular computer behind the firewall cannot be identified by an outside resource.

The activation agent 109a overcomes the above limitations of the firewall 107. By issuing requests, the activation agent 109 identifies itself to the intermediary server 105. In one embodiment, these requests are http requests which are acceptable to the proxy firewall. In addition, the proxy firewall considers such a request as an outstanding request and, therefore, allows a corresponding response by the intermediary service 105 to be conveyed to the destination computer 109.

In one embodiment, each destination computer request (or advertisement) includes a customer identifier (id) of the destination computer 109 and the time of its next advertisement. For example, the activation agent 109a may issue advertisements with an interval of 1 minute. In one embodiment, the intermediary service 105 may periodically change the frequency of advertisements to avoid overloading.

The dispatcher 105c receives an advertisement, stores the destination computer customer id and the time of the next advertisement in the database 105f, and responds to the activation agent 109a. Depending on the number of destination computers issuing advertisements, one or more dispatchers residing on different computer systems may be used to support the advertising activity of the destination computer systems.

If the browser 101 has not yet issued a request to access the destination computer, the dispatcher 105c sends a response to the activation agent 109a indicating the time of the next advertisement. Otherwise, if the browser has issued a request, the dispatcher 105c sends a response to the activation agent 109a redirecting it to one of IP address of the bridge proxy 105a. The redirection process is described in more detail below. In one embodiment, the advertisements of the activation agent 109a and the responses of the dispatcher 105c are not encrypted since they do not contain any pertinent information and merely constitute a preparation for an actual exchange of information between the destination computer system 109 and the web browser 101.

In one embodiment, upon receiving the redirection response, the activation agent 109a transfers the response to the bridge adapter 109b, which then connects to the specified IP address of the bridge proxy 105a. The bridge proxy 105a then acts as an intermediary in providing communication between the destination computer system 109 and the browser 101.

Figure 5A:
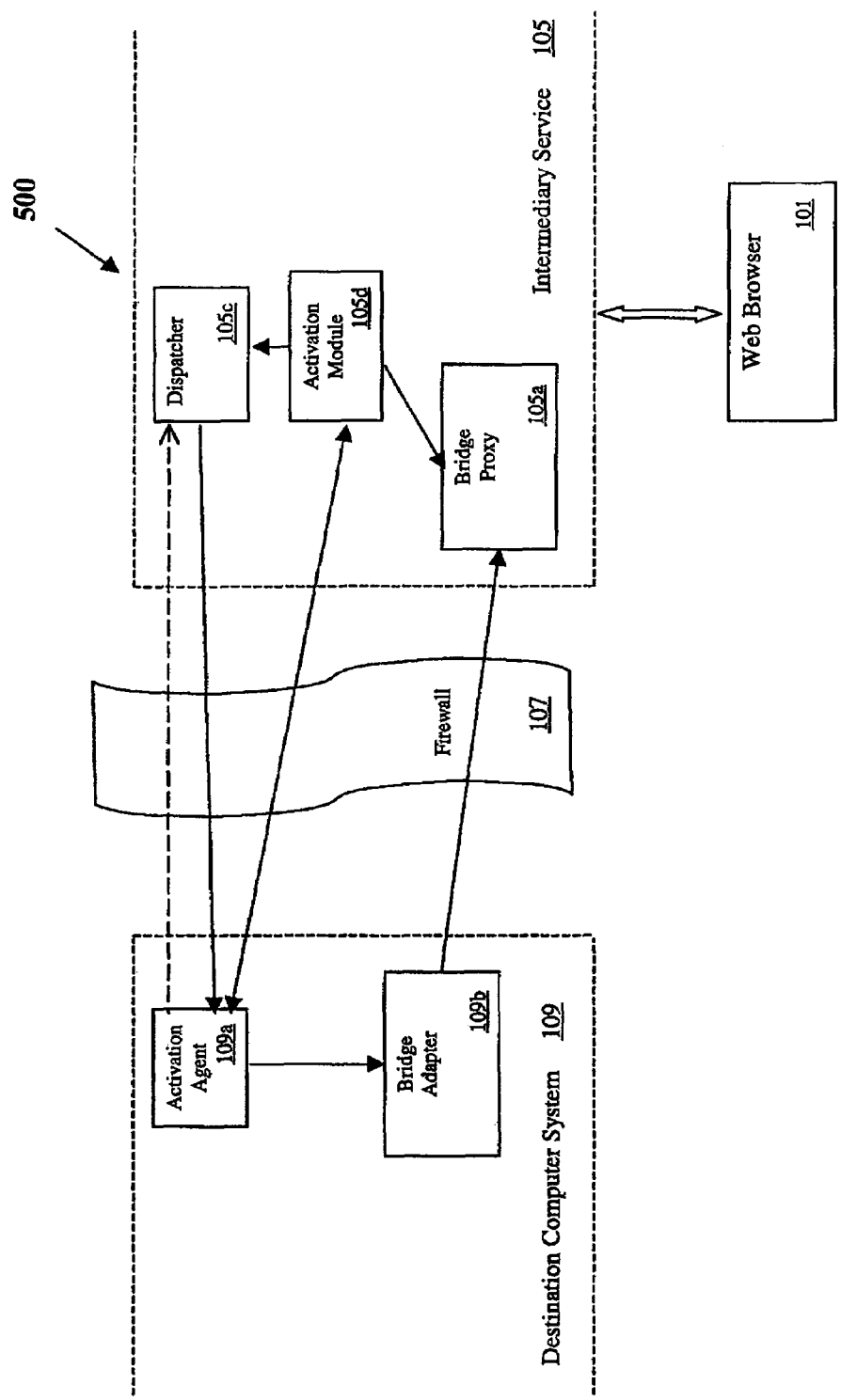
FIG. 5a is a block diagram of one embodiment of a process flow for activating a destination computer.

FIG. 5a is a block diagram of one embodiment of a process flow for activating a destination computer behind a firewall. Referring to FIG. 5a, a remote user uses an arbitrary browser, such as the web browser 101, to request access to the destination computer 109. The access is provided by the intermediary service 105.

In one embodiment, the activation begins by the activation module 105d verifying that the user is registered with the intermediary service 105 and presenting the user with an activation dialog. The activation dialog asks the user to initiate activation (e.g., by entering an activation password) of the destination computer 109 which the user wishes to access.

During the activation, the activation module 105d notifies the dispatcher 105c that the user is waiting for the activation to complete. As discussed above in conjunction with FIG. 4, the dispatcher 105c constantly receives advertisements of various computers including advertisements of the destination computer system 109 (shown by a dotted line between the activation agent 109a and the dispatcher 105c). When the dispatcher 105c receives the next advertisement from the activation agent 109a, it redirects the activation agent 109a to the activation module 105d. Because the dispatcher 105c knows when to expect the next advertisement, the user may be notified of an estimated waiting period of time that is required for the activation to be completed.

The activation module 105d then facilitates the exchange of activation information between the destination computer system 109 and the browser 101. The exchange of the activation information is used to authenticate the user to the destination computer system 109. To protect the privacy of its users, the intermediary service 105 is unaware of the actual content of the activation information and is used only as a mechanism to transfer the activation information between the activation agent 109a and the browser 101. That is, the activation information is transferred in an encrypted form and can be decrypted only by the destination computer system 109. It should be noted that the authentication of the user could be performed in a variety of other ways known in the art without loss of generality.

When the authentication of the user completes successfully, the activation module 105d notifies the bridge proxy 105a and redirects the browser 101 to one of the IP addresses of the bridge proxy 105a. On the side of the destination computer system 109, the activation agent 109a transfers control to the bridge adapter 109b which is redirected to the same location. The redirection of both the browser 101 and the destination computer system 109 is described in greater detail below in conjunction with FIG. 6a. This redirection completes the activation of the destination computer system 109. Subsequently, the bridge proxy 105a acts as an intermediary between the destination computer system 109 and the browser 101 to convey the browser requests to the destination computer system 109 and to deliver its responses to the browser 101, as will be described in more detail below.

Figure 5B:
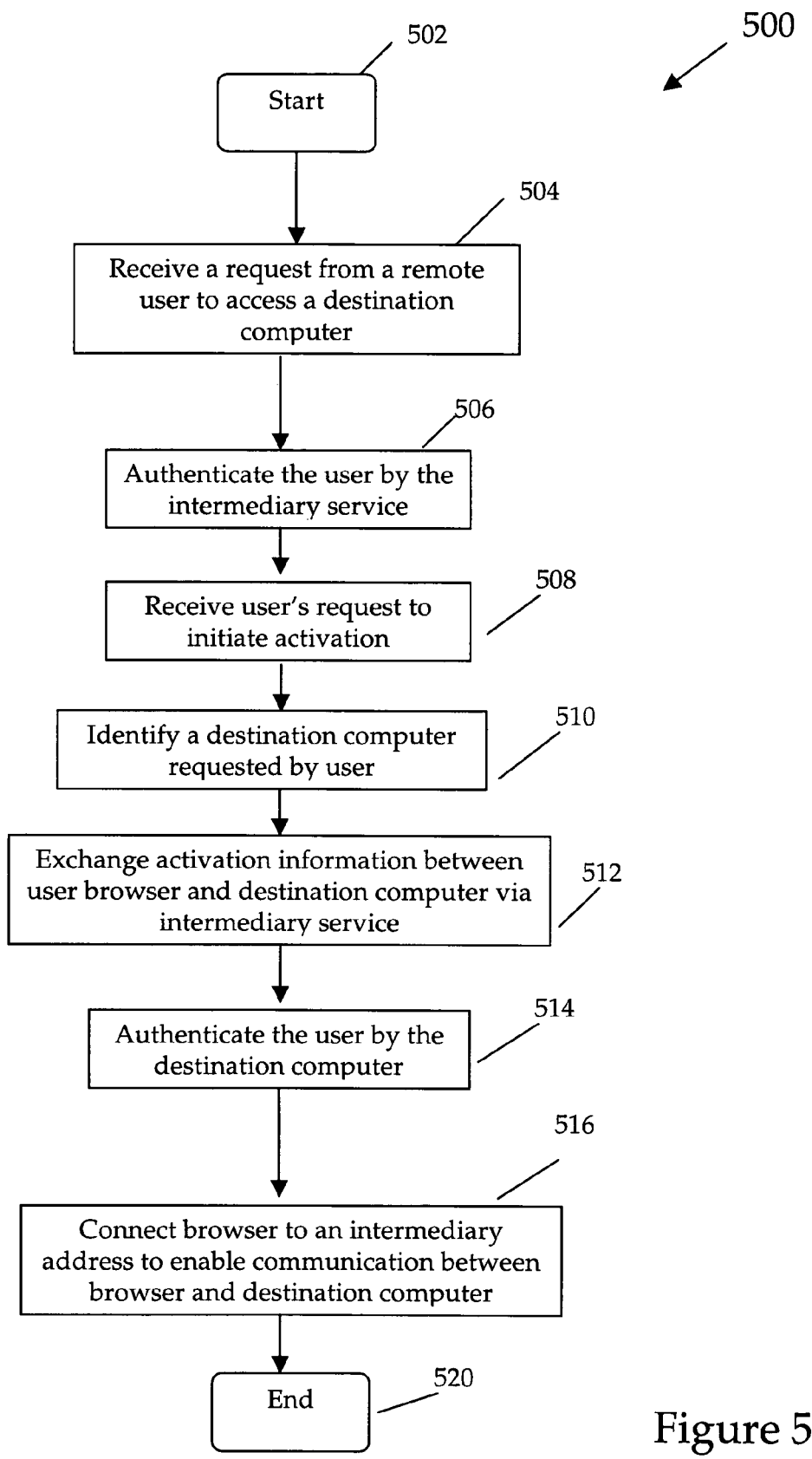
FIG. 5b is a flow diagram of one embodiment of a process for activating a destination computer.

FIG. 5b illustrates a flow diagram of one embodiment of a process for activating a destination computer behind a firewall. The process is performed by processing logic, which may comprise hardware, software, or a combination of both. The processing logic may be in either or both of the home portal computer system and the intermediary server. In an alternative embodiment, some of the processing logic may not be in the home portal computer system or the intermediary server; instead, the processing logic may be in a separate device and/or system.

Referring to FIG. 5b, the process begins with processing logic receiving a request from a remote user to access destination computer (processing block 504). Next, processing logic in the intermediary service 105 authenticates the user (processing block 506). That is, the intermediary service 105 requests authentication information from the user (e.g. a user identifier and a password) and verifies that this information is correct.

At processing block 508, processing logic in the intermediary service 105 receives the user request to initiate activation of the destination computer system 109. As described above, in one embodiment, the user is presented with an activation dialog which requests the user to confirm the initiation of the activation process. Next, at processing block 510, processing logic in the intermediary service 105 identifies a destination computer requested by the user using advertisements sent to the intermediary service 105 by the destination computer system 109.

Afterwards, processing logic in the intermediary service 105 enables an exchange of the activation information between the user browser 101 and the destination computer system 109 (processing logic 512). This exchange is used by processing logic in the destination computer system 109 to authenticate the user (processing block 514). This authentication is done directly by the destination computer 109 to verify that the user is authorized to access the destination computer 109. At processing block 516, the browser 101 is redirected to one of the IP addresses of the intermediary service 105 (i.e., an intermediary IP address) for communications between the browser 101 and the destination computer system 109. At the same time, the destination computer system 109 is redirected to an intermediary URL (i.e., one of the URLs of the intermediary service 105) for subsequent communication with the bridge proxy 105a.

Figure 6A:
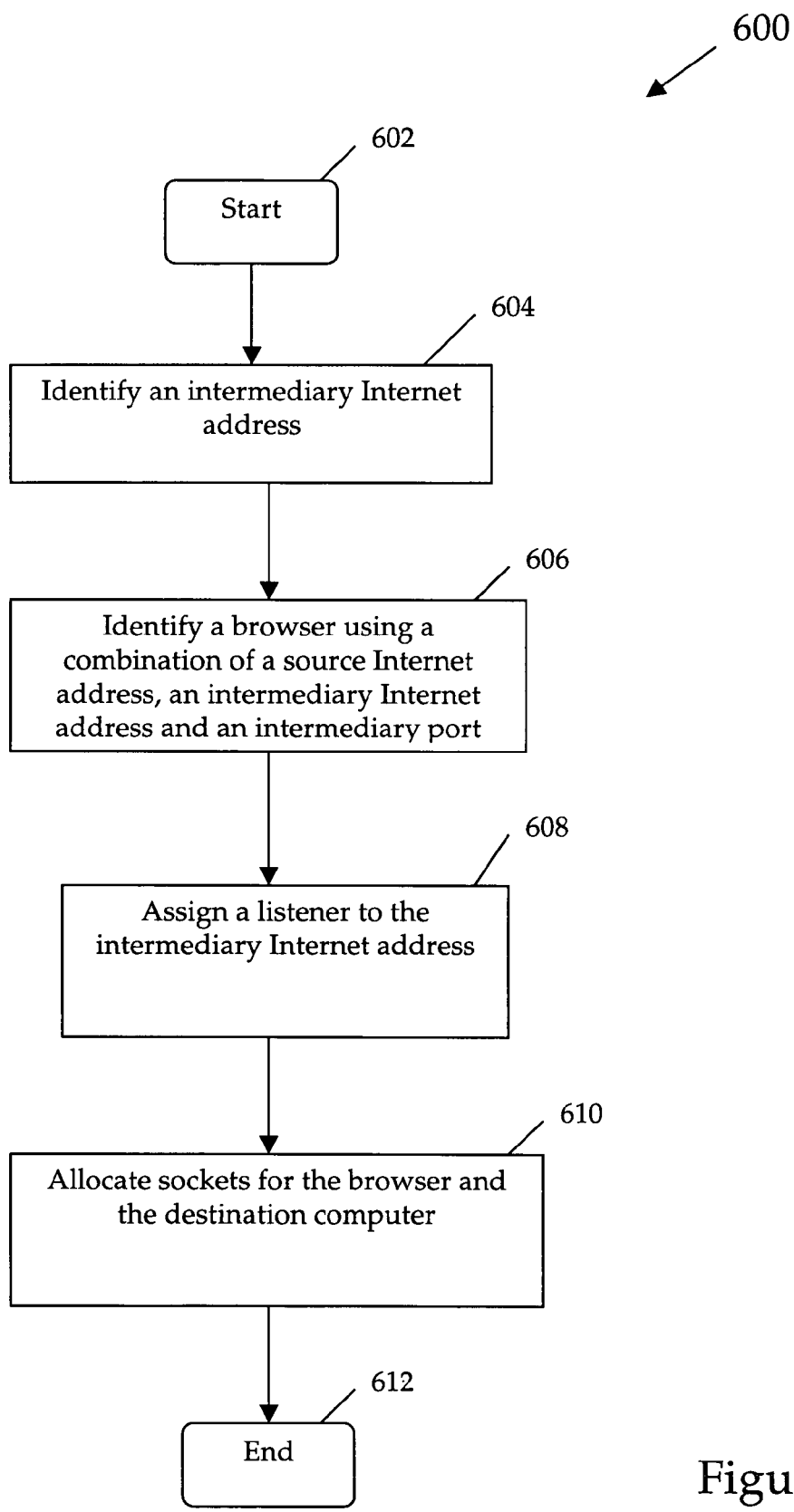
FIG. 6a is a flow diagram of one embodiment of a process for redirecting a remote browser and a destination computer to a bridge proxy.

FIG. 6a is a flow diagram of one embodiment of the process for redirecting the browser 101 and the destination computer system 109 to the bridge proxy 105c. The process is performed by processing logic, which may comprise hardware, software, or a combination of both. The processing logic may be in the intermediary service 105. In an alternative embodiment, some of the processing logic may not be in the intermediary service 105; instead, the processing logic may be in a separate device and/or system.

Referring to FIG. 6a, the process begins with processing logic identifying an intermediary IP address (processing block 504). The intermediary IP address is one of many IP addresses of the bridge proxy 105a. For example, the bridge proxy 105a may have up to 1000 public IP addresses associated with physical resources of the bridge proxy 105c. The IP addresses are also used by the bridge proxy 105a to uniquely identify each remote user and a session between the remote user and the destination computer 109, as will be described in more detail below.

When determining the intermediary IP address, the bridge proxy 105 queries the database 105f to select an available IP address from IP addresses assigned to the source IP address of the user. In one embodiment, the bridge proxy 105a, in its communications with the browser 101 and the destination computer system 109, uses uniform resource locators (URLs) which correspond to the IP addresses of the bridge proxy 105a. A URL may include the name of the user and a set of characters reserved to identify a current session between the browser 101 and the destination computer system 109. The DNS server 105b maps a portion of the URL (i.e., a host name) into an IP address.

In one embodiment, an intermediary URL is assigned for communications between the destination computer system 109 and the bridge proxy 105a. The dispatcher 105c facilitates redirection of the bridge adapter 109b to the intermediary URL. Subsequently, the bridge adapter 109b sends the next advertisement to the intermediary URL of the bridge proxy 105a.

At processing block 606, processing logic in the intermediary service 105 identifies the remote browser. Typically, a server may identify a client using a cookie sent with a client request or a client URI. However, because the request sent by the browser 101 is encrypted and only the destination computer system 109 can decrypt it (to provide secure exchange between the browser and the destination computer), the cookie included in the browser request cannot be used to identify the browser. Neither can the URI of the remote browser be used for this purpose. That is, although in communications of secure transactions (e.g., HTTPS transactions) the source address can be obtained from a TCP/IP header, this source address cannot be relied on under certain circumstances. For example, the source address may not uniquely identify the user if the browser request is sent by a browser placed behind a firewall or an http proxy, e.g., if an employee wishes to access a certain file on her computer at work while being at a meeting held at a customer site and using one of the customer's computers. If the customer's computers are protected by a firewall or an http proxy, they all will have the same IP address, i.e. the IP address of the firewall.

In one embodiment, the bridge proxy 105a uniquely identifies each remote browser using a combination of a source IP address, an intermediary IP address and an intermediary port. In this combination, the source IP address is either an actual IP address of the browser or the IP address of the firewall or http proxy. The intermediary address is one of the addresses of the bridge proxy 105c which are associated with the source address of the browser. The intermediary port is one of the bridge proxy's ports associated with the intermediary address, e.g. a standard port 443. According to the preferred embodiment, 1000 IP addresses are sufficient to uniquely identify all users requesting access to destination computers of a sizable organization.

Figure 6B:
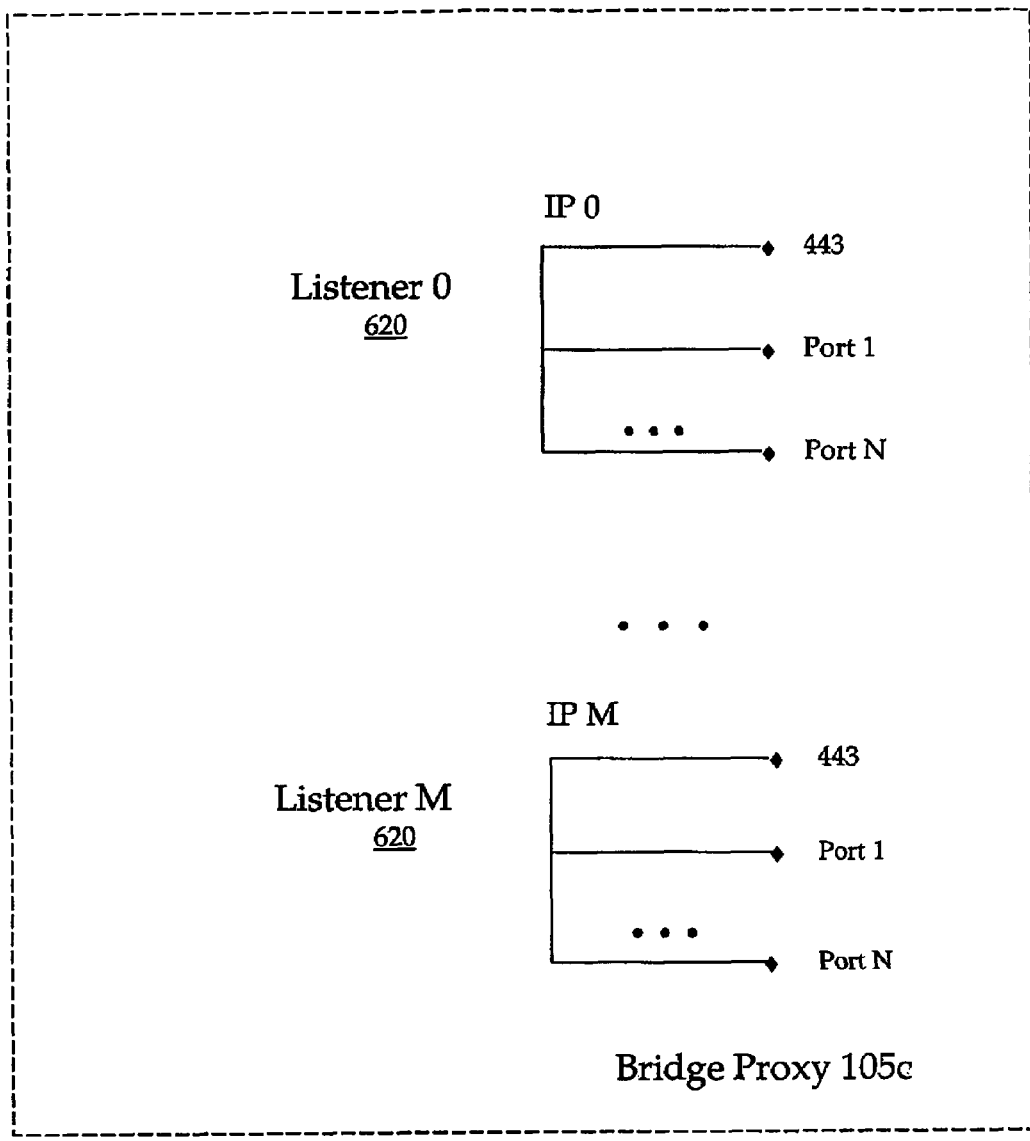
FIG. 6b illustrates a plurality of listeners of a bridge proxy.

At processing block 608, processing logic in the intermediary service 105 assigns a listener to the intermediary address and port. In one embodiment, the listener is assigned once the destination computer system 109 is activated. FIG. 6b illustrates multiple listeners 620 of the bridge proxy 105c. Each listener 620 supports transactions incoming to and outgoing from various ports (including a standard port 443) of a corresponding IP address. In one embodiment, the listener 620 is de-allocated when the browser 101 disconnects from the intermediary service 105. Alternatively, the listener 620 is de-allocated upon the expiration of a certain period of time.

Returning to FIG. 6a, at processing block 610, processing logic in the intermediary service 105 allocates a socket to transfer data between the intermediary service 105 and the destination computer system 109. In addition, a socket is allocated to transfer data between the intermediary service 105 and the browser 101. As a result, the bridge proxy 105a is ready to facilitate communication between the browser 101 and the destination computer system 109.

Figure 7A:
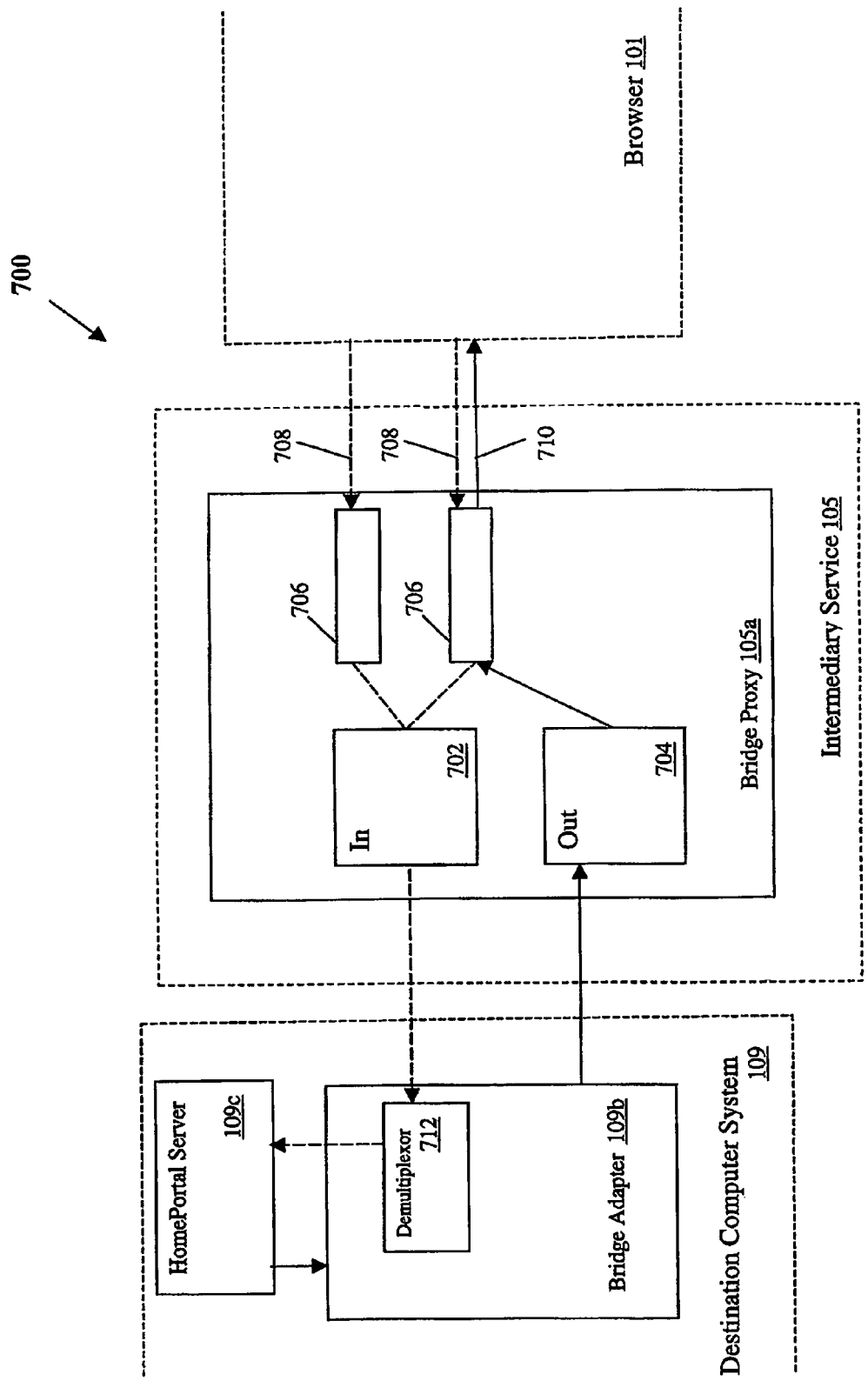
FIG. 7a is a block diagram of one embodiment of a process flow for providing communication between a destination computer and a remote browser via an intermediary service.

FIG. 7a is a block diagram of one embodiment of a process for providing communication between the destination computer system 109 and the remote browser 101 via the intermediary service 105. In one embodiment, the bridge proxy 105a transparently conveys the browser requests to the destination computer 109 and delivers responses to the browser 101. It should be noted that although the intermediary service 105 facilitates the exchange between the destination computer system 109 and the browser 101, the intermediary service 105 is unable to decrypt the exchanged information and has no knowledge of its content because https protocol used for communications is not vulnerable to the man-in-the-middle attack.

As described above, the intermediary service 105 matches the destination computer system 109 and the browser 101 using the latest advertisement of the destination computer system 109 and the browser request. The browser user who issued the request is identified using a unique combination of the source IP address, the intermediary IP address and the destination port. The browser 101 is informed of the intermediary address and port that should be used for sending requests and responses. The bridge adapter 109b then directs a next advertisement to the intermediary URL. In the meantime, the bridge proxy 105 assigns a listener to the intermediary address and port and allocates sockets for communications with the destination computer 109 and communications with the browser 101.

Referring to FIG. 7a, the browser 101 sends a request to the intermediary address and port. The bridge proxy 105a verifies the source IP address which is a part of the unique combination described above. The bridge proxy 105a uses the unique combination, which includes the source IP address, the intermediary IP address and the port, to identify the session between the browser 101 and the destination computer system 109. In one embodiment, the browser 101 issues multiple requests during the session. Each request is communicated to the bridge proxy 105a using a corresponding socket. Each socket is assigned a socket number. The bridge proxy 105a stores the unique combination identifying the session and the socket number identifying a particular browser request in the database 105f. This information is subsequently used by the bridge proxy 105a to associate a destination computer response with the browser request.

The bridge proxy 105a uses an in-multiplexor 702 to pass original browser requests to the bridge adapter 109b. An out-multiplexor is used to pass a destination computer response to the browser 101. The in-multiplexor 702 and the out-multiplexor 704 can be characterized as communications devices performing functions of web servers. The bridge adapter 109b issues requests to the in-multiplexor 702 and the out-multiplexor 704 and receives responses from them as if they were regular web servers.

In one embodiment, the in-mutiplexor 702 receives browser requests 708 from the listener 620 (not shown). The in-mutiplexor 702 combines the browser requests (e.g., https requests) and transmits them over a single communication pipe to the bridge adapter 109b, in the form of a response (e.g., an http response).

In effect, the response is a reply to the request sent by the destination computer system 109 as its latest advertisement. In one embodiment, the response is a continuing http response similar to those used in the media streaming. To ensure that uninterrupted http connection is maintained, the http response is constantly supplied with data (including dummy data if necessary to provide continuity).

The bridge adapter 109b receives the response from the in-mutiplexor 702 and uses a demultiplexor 712 to separate multiple browser requests which are included in the received response. The bridge adapter 109b then passes each browser request to the home portal server 109c. The home portal server 109c processes each browser request and generates a destination computer response to each browser request. In one embodiment, the destination computer response is an https response. The bridge adapter 109b includes the destination computer response into a request (e.g., an http request) and sends it to the out-multiplexor 704.

The out-mutiplexor 704 separates the destination computer response wrapped in the request and associates the destination computer response with the original browser request. In one embodiment, the exchange between the bridge adapter 109b and both multiplexors 702 and 704 is in the form of http requests and http responses, i.e. the exchanged information is not encrypted. Therefore, cookies or URIs may be used to associate destination computer responses (included in http requests) with corresponding browser requests (included in http responses).

Next, the out-multiplexor 704 retrieves a socket number associated with the browser request from the database 105f and sends the destination computer response 710 to the browser 101 over an appropriate socket 706.

Figure 7B:
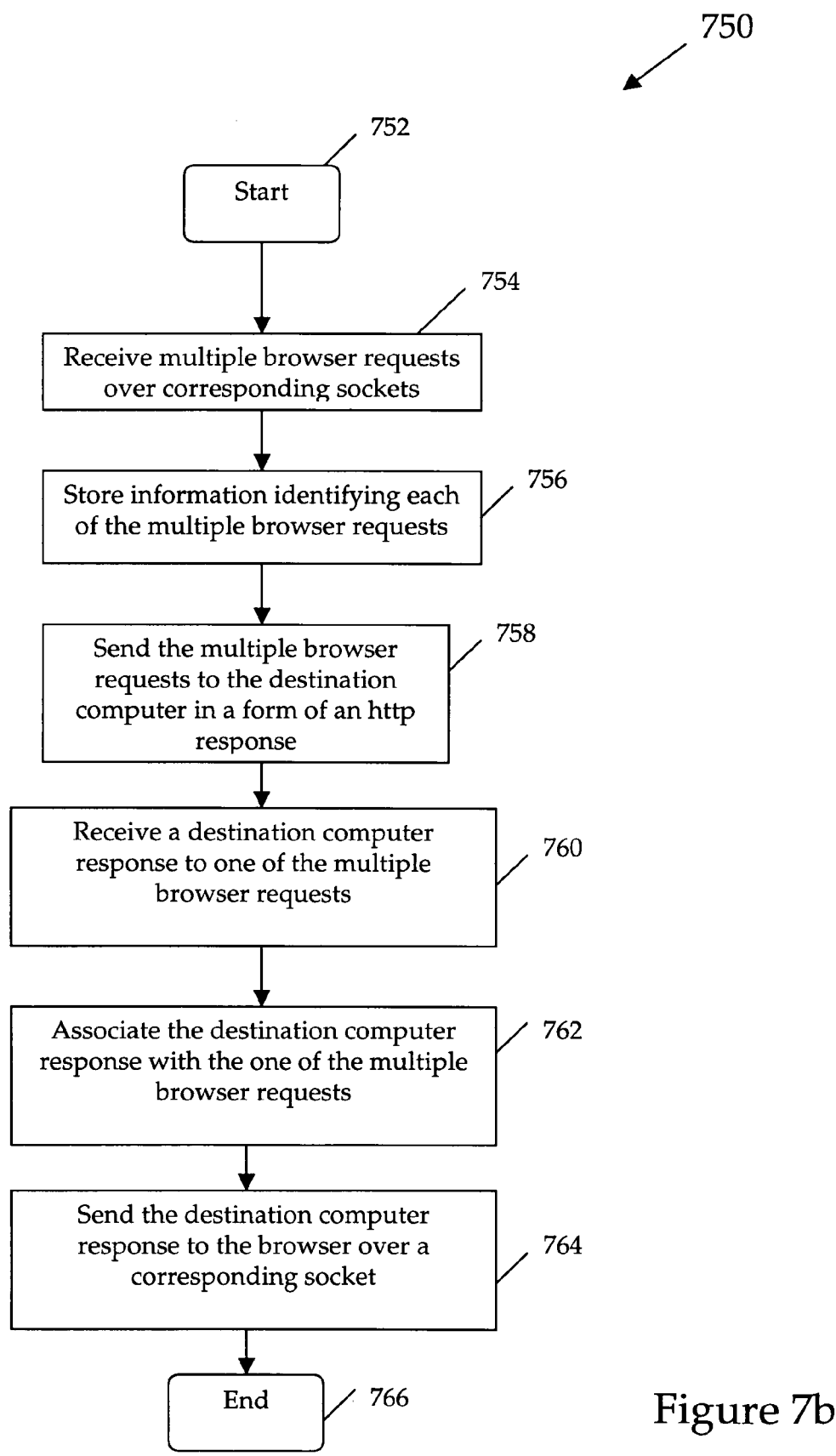
FIG. 7b is a flow diagram of one embodiment of a process for providing communication between a destination computer and a remote browser via an intermediary service.

FIG. 7b is flow diagram of one embodiment of a process for providing communication between the destination computer system 109 and the remote browser 101 via the intermediary service 105. The process is performed by processing logic, which may comprise hardware, software, or a combination of both. The processing logic may be in any computer system of the intermediary service. In an alternative embodiment, some of the processing logic may not be in the computer systems of the intermediary service; instead, the processing logic may be in a separate device and/or system(s).

Referring to FIG. 7b, the process begins with processing logic in the intermediary service 105 receiving multiple browser requests over corresponding sockets (processing block 754). The multiple browser requests are received within one session. Next, information identifying each of the multiple browser requests is stored in the database 105(f) (processing block 754). This information includes a unique combination (i.e., the source IP address, the intermediary IP address and the port) which identifies the browser user and/or the current session. The identifying information also includes a socket number assigned to a socket used for a particular browser request.

At processing block 758, processing logic in the intermediary service 105 sends the multiple browser requests to the destination computer system 109. The multiple browser requests are sent in the form of a response (e.g., an http response) to constitute a reply to the outstanding request. The outstanding request is the latest advertisement of the destination computer system 109.

Next, processing logic in the intermediary service 105 receives a response to one of the multiple browser requests from the destination computer system 109 (processing block 760). Again the destination computer response is sent in the form of a request (e.g., an http request). Afterwards, processing logic in the intermediary service 105 associates the destination computer response with the appropriate browser request (processing block 762) and sends the response to the browser over a corresponding socket (processing block 764).

Figure 8:
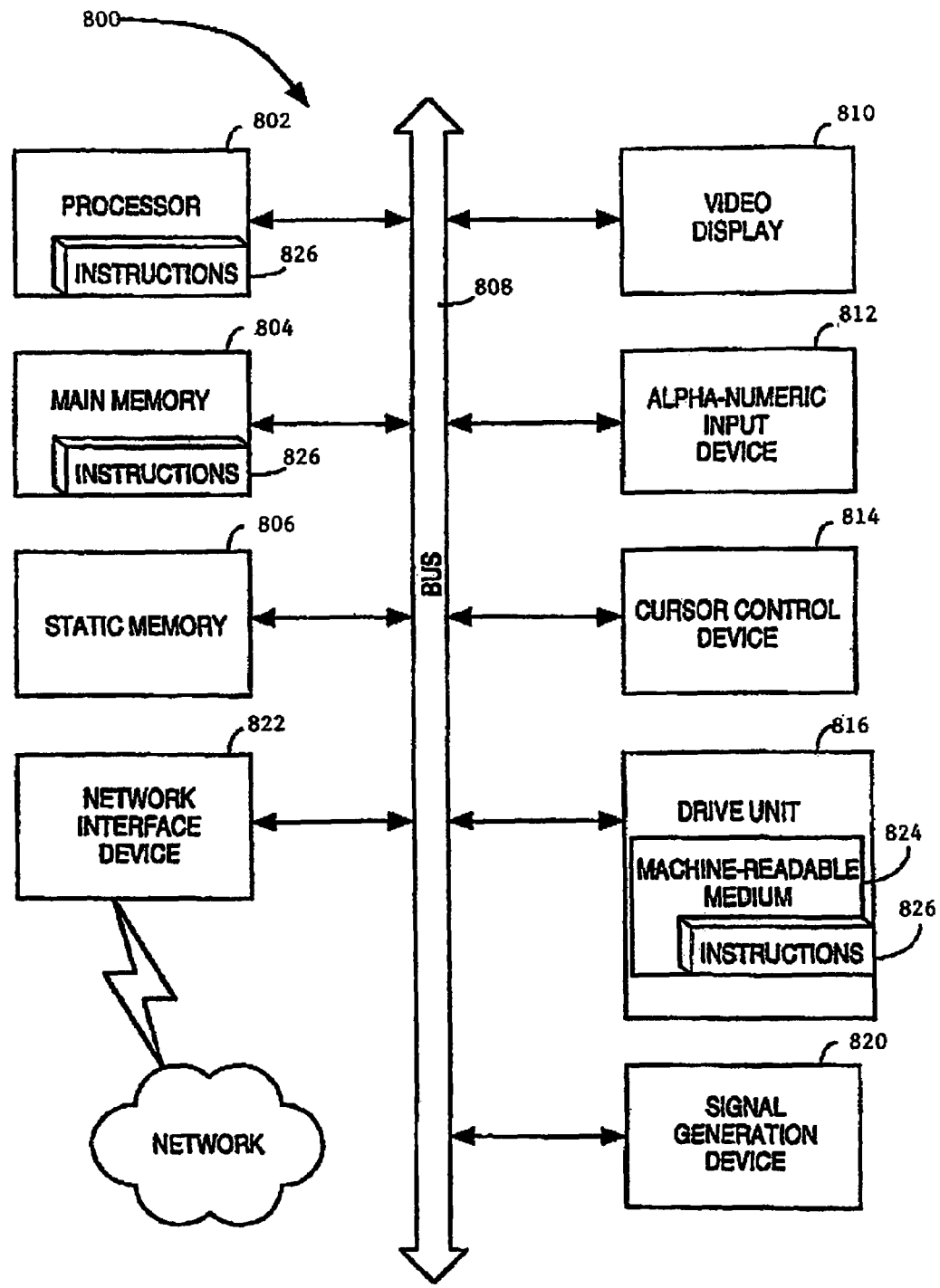
FIG. 8 is a block diagram of one embodiment of a computer system.

FIG. 8 shows a diagrammatic representation of machine in the exemplary form of a computer system 800 within which a set of instructions, for causing the machine to perform any one of the methodologies discussed above, may be executed. In alternative embodiments, the machine may comprise a network router, a network switch, a network bridge, Personal Digital Assistant (PDA), a cellular telephone, a web appliance or any machine capable of executing a sequence of instructions that specify actions to be taken by that machine.

The computer system 800 includes a processor 802, a main memory 804 and a static memory 806, which communicate with each other via a bus 808. The computer system 800 may further include a video display unit 810 (e.g., a liquid crystal display (LCD) or a cathode ray tube (CRT)). The computer system 800 also includes an alpha-numeric input device 812 (e.g., a keyboard), a cursor control device 814 (e.g., a mouse), a disk drive unit 816, a signal generation device 820 (e.g., a speaker) and a network interface device 822.

The disk drive unit 816 includes a computer-readable medium 824 on which is stored a set of instructions (i.e., software) 826 embodying any one, or all, of the methodologies described above. The software 826 is also shown to reside, completely or at least partially, within the main memory 804 and/or within the processor 802. The software 826 may further be transmitted or received via the network interface device 822. For the purposes of this specification, the term "computer-readable medium" shall be taken to include any medium that is capable of storing or encoding a sequence of instructions for execution by the computer and that cause the computer to perform any one of the methodologies of the present invention. The term "computer-readable medium" shall accordingly be taken to included, but not be limited to, solid-state memories, optical and magnetic disks, and carrier wave signals.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

Thus, a method and apparatus for remotely accessing a destination computer behind a firewall using a web browser have been described.

What is claimed is:

1. A method for accessing a destination computer behind a firewall, the method comprising:
    receiving a request at a predetermined interval after a previous request from a destination computer behind the firewall, the destination computer request demonstrating that the destination computer is available to be accessed;
    receiving a request from a remote browser to access the destination computer;
    associating the browser with the destination computer using the browser request and a corresponding destination computer request; and
    providing communication between the browser and the destination computer, the communication being in a form acceptable to the firewall.

2. The method of claim 1 further comprising activating the destination computer upon receiving the browser request.

3. The method of claim 2 wherein activating the destination computer further comprises:
    notifying a user of an estimated waiting period of time required to complete activation;
    performing authentication of a user by the destination computer; and
    redirecting the destination computer to an intermediary URL for further communication with bridge proxy.

4. The method of claim 1 wherein the browser request is encrypted.

5. The method of claim 1 further comprising uniquely identifying the remote browser based upon a combination of a source Internet address, an intermediary Internet address and an intermediary port.

6. The method of claim 5 wherein the combination is used to identify a session between the browser and the destination computer.

7. The method of claim 5 further comprising:
    redirecting the browser to the intermediary Internet address and port; and
    assigning a listener to the intermediary Internet address and port.

8. The method of claim 1, wherein the received request is one of a plurality of requests received at predetermined intervals.

9. The method of claim 1 wherein providing communication further comprises:
    receiving multiple browser requests using corresponding sockets, the multiple browser requests being issued during a session between the browser and an intermediary service;
    storing information identifying each of the multiple browser requests;
    sending the multiple browser requests to the destination computer in a form of an http response, the http response constituting a reply to the most recent of the destination computer requests;
    receiving a destination computer response to one of the multiple browser requests, the destination computer response being included in an http request; and
    sending the destination computer response to the browser using a corresponding socket.

10. The method of claim 9 wherein the destination computer response is encrypted.

11. The method of claim 9 wherein the identifying information includes session information and a socket number.

12. The method of claim 1 wherein the communication between the browser and the destination computer is provided in a secure manner.

13. A method for providing access to a destination computer behind a firewall, the method comprising:
    sending destination computer requests to an intermediary service at predetermined intervals, the destination computer requests demonstrating that the destination computer is available to be accessed;
    receiving a response from the intermediary service, the response including a request of a remote browser to access the destination computer;
    generating information in response to the browser request; and
    sending the generated information to the intermediary service, the generated information being sent in a form of a request.

14. The method of claim 13 wherein the destination computer requests are http requests.

15. The method of claim 13 wherein the information generated by the destination computer is included in an http request.

16. The method of claim 13 wherein each of the destination computer requests establishes a TCP/IP connection with an intermediary service.

17. The method of claim 13 wherein each of the destination computer requests includes an identifier of the destination computer and a time of a next request.

18. The method of claim 13 wherein predetermined intervals are periodically redefined by the intermediary service.

19. The method of claim 13 further comprising authenticating a user of the remote browser by the intermediary service and the destination computer.

20. The method of claim 13 further comprising:
    receiving an intermediary URL from the intermediary service; and sending a subsequent destination computer request to the intermediary URL.

21. The method of claim 20 wherein the response of the intermediary service constitutes a reply to the subsequent destination computer request.

22. The method of claim 13 wherein the response of the intermediary service includes multiple browser requests.

23. The method of claim 22 comprising:
    separating each of the multiple browser requests included in the response of the intermediary service;
    generating a response to each of the multiple browser requests; and sending the response to the intermediary service, the response being included into an http request.

24. A system for accessing a destination computer behind a firewall, the system comprising:

the destination computer issuing requests to an intermediary service at predetermined intervals, demonstrating that the destination computer is available to be accessed;

a remote browser issuing a browser request to access the destination computer;

the intermediary service coupled to the browser and the destination computer via a network, the intermediary service receiving the destination computer requests and the browser request, associating the browser with the destination computer using the browser request and a corresponding destination computer request, and providing communication between the browser and the destination computer, the communication being in a form acceptable to the firewall.

25. The system of claim 24 wherein the intermediary service is further configured to coordinate activation of the destination computer upon receiving the browser request.

26. The system of claim 24 wherein the intermediary service is further configured to uniquely identify the remote browser based upon a combination of a source Internet address, an intermediary Internet address and an intermediary port.

27. The system of claim 24 wherein the intermediary service comprises a bridge proxy configured to receive multiple browser requests using corresponding sockets, the multiple browser requests being issued during a session between the browser and an intermediary service, store information identifying each of the multiple browser requests, send the multiple browser requests to the destination computer in a form of an http response, the http response constituting a reply to the most recent of the destination computer requests, receive a destination computer response to one of the multiple browser requests, the destination computer response being included in an http request, and send the destination computer response to the browser using a corresponding socket.

28. The system of claim 24 wherein the intermediary service provides secure communication between the browser and the destination computer.

29. The system of claim 24 wherein the destination computer requests are http requests.

30. The system of claim 24 wherein each of the destination computer requests includes an identifier of the destination computer and a time of a next request.

31. The system of claim 24 wherein the destination computer generates information in response to the browser request and transmits the generated information to the intermediary service in a form of an http request.

32. The system of claim 24 wherein the destination computer comprises a bridge adapter receiving an intermediary URL from the intermediary server and sending a subsequent destination computer request to the intermediary URL.

33. The system of claim 32 wherein the bridge adapter is further configured to receive a response from the intermediary service, the response including multiple browser requests, separate each of the multiple browser requests included in the response of the intermediary service, and send a response to each of the multiple browser requests to the intermediary service, the response being included into an http request.

34. A computer readable medium comprising instructions, which when executed on a processor, cause the processor to perform a method for accessing a destination computer behind a firewall, the method comprising:

receiving a request at a predetermined interval after a previous request from a destination computer behind the firewall, the destination computer request demonstrating that the destination computer is available to be accessed;

receiving a request from a remote browser to access the destination computer;

associating the browser with the destination computer using the browser request and a corresponding destination computer request; and providing communication between the browser and the destination computer, the communication being in a form acceptable to the firewall.

35. A computer readable medium comprising instructions, which when executed on a processor, cause the processor to perform a method for providing access to a destination computer behind a firewall, the method comprising:

sending destination computer requests to an intermediary service at predetermined intervals, the destination computer requests demonstrating that the destination computer is available to be accessed;

receiving a response from the intermediary service, the response including a request of a remote browser to access the destination computer;

generating information in response to the browser request; and sending the generated information to the intermediary service, the generated information being sent in a form of a request.

* * * * *